(12) United States Patent
Tousignant

(10) Patent No.: US 6,318,785 B1
(45) Date of Patent: Nov. 20, 2001

(54) AUTOMOTIVE VEHICLE FOOT REST

(75) Inventor: James E. Tousignant, New Boston, MI (US)

(73) Assignee: ASC Incorporated, Southgate, MI (US)

( * ) Notice: Subject to any disclaimer, the term of this patent is extended or adjusted under 35 U.S.C. 154(b) by 0 days.

(21) Appl. No.: 09/687,175

(22) Filed: Oct. 13, 2000

(51) Int. Cl.⁷ .................................................. B60N 3/06
(52) U.S. Cl. ................... 296/75; 297/423.1; 297/423.18; 297/423.44
(58) Field of Search .......................... 296/75; 257/423.1, 257/423.18, 423.39, 423.44, 423.46

(56) References Cited

U.S. PATENT DOCUMENTS

| | | |
|---|---|---|
| 2,862,761 | 12/1958 | Scheidegger . |
| 3,059,960 | 10/1962 | Komorowski et al. . |
| 4,010,975 | 3/1977 | Horton . |
| 4,310,193 | 1/1982 | Kolleas . |
| 4,635,999 * | 1/1987 | Simpson .............................. 297/328 |
| 4,726,438 | 2/1988 | Stuertz et al. . |
| 4,809,180 | 2/1989 | Saitoh . |
| 4,955,658 * | 9/1990 | Graves ..................................... 296/75 |
| 5,018,783 | 5/1991 | Chamings et al. . |
| 5,183,308 | 2/1993 | Koga et al. . |
| 5,294,180 * | 3/1994 | Grimm ............................ 297/423.44 |
| 5,312,155 * | 5/1994 | Akima et al. ...................... 297/423.1 |
| 5,352,013 * | 10/1994 | Rusyniak ........................... 297/423.1 |
| 5,374,102 * | 12/1994 | Archambault et al. ......... 297/423.26 |
| 5,447,359 * | 9/1995 | Asbjornsen et al. ............. 297/423.35 |
| 5,462,335 | 10/1995 | Seyler . |
| 5,482,346 | 1/1996 | Lesourd . |
| 5,507,562 | 4/1996 | Wieland . |
| 5,584,535 * | 12/1996 | Jacobson et al. ............... 297/423.46 |
| 5,651,587 | 7/1997 | Kodaverdian . |
| 5,755,493 | 5/1998 | Kodaverdian . |
| 5,788,328 | 8/1998 | Lance . |
| 5,823,620 | 10/1998 | Le Caz . |
| 5,826,941 * | 10/1998 | Olsen .............................. 297/423.39 |
| 5,836,637 | 11/1998 | Laginess et al. . |
| 5,887,949 | 3/1999 | Kodaverdian . |
| 6,007,151 | 12/1999 | Benson . |
| 6,038,819 | 3/2000 | Klein . |
| 6,042,452 * | 3/2000 | Niebrugge ....................... 297/423.44 |
| 6,073,515 * | 6/2000 | Elton et al. ............................. 296/75 |
| 6,241,301 * | 6/2001 | Speth et al. ............................ 296/75 |

FOREIGN PATENT DOCUMENTS

| | | |
|---|---|---|
| 40 01 101 * | 7/1991 | (DE) . |
| 198 51 118 * | 5/2000 | (DE) . |
| 2-799 164 * | 10/1999 | (FR) . |
| 2-290750 * | 11/1990 | (JP) . |
| 5-278512 * | 10/1993 | (JP) . |
| 6-239172 * | 8/1994 | (JP) . |

OTHER PUBLICATIONS

"General Motors illustration (prior to Oct. 13, 2000)".

* cited by examiner

Primary Examiner—Joseph D. Pape
Assistant Examiner—Kiran B. Patel
(74) Attorney, Agent, or Firm—Harness, Dickey & Pierce, P.L.C.

(57) ABSTRACT

A motor vehicle foot rest includes a movable foot rest panel, a driving mechanism and an actuator. In another aspect of the present invention, a flexible and linearly movable cable pushes or pulls a linearly movable slide capable of raising or lowering a foot rest panel. A further aspect of the present invention provides a linearly movable slide which is coupled to an elongated and relatively stationary track.

24 Claims, 6 Drawing Sheets

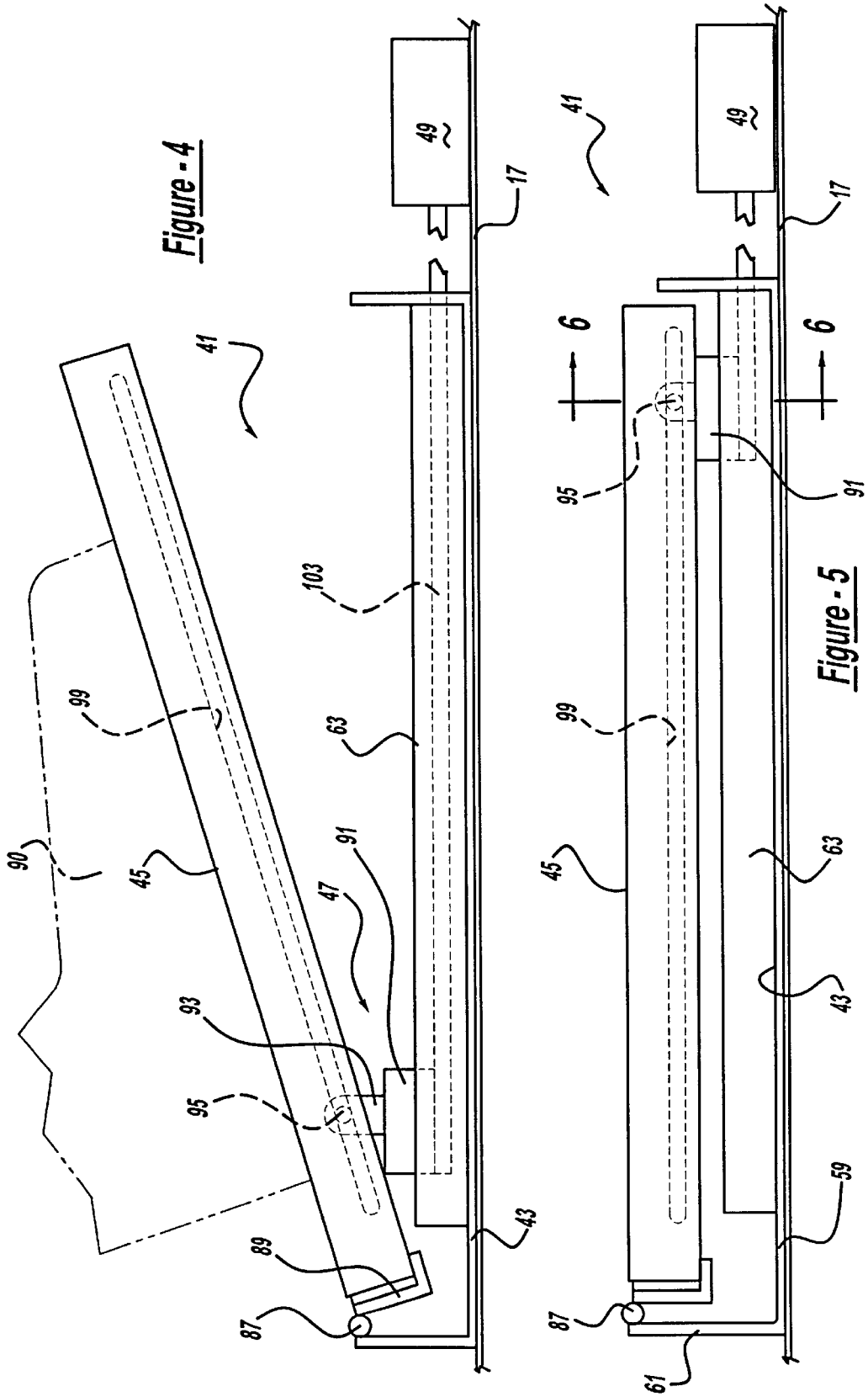

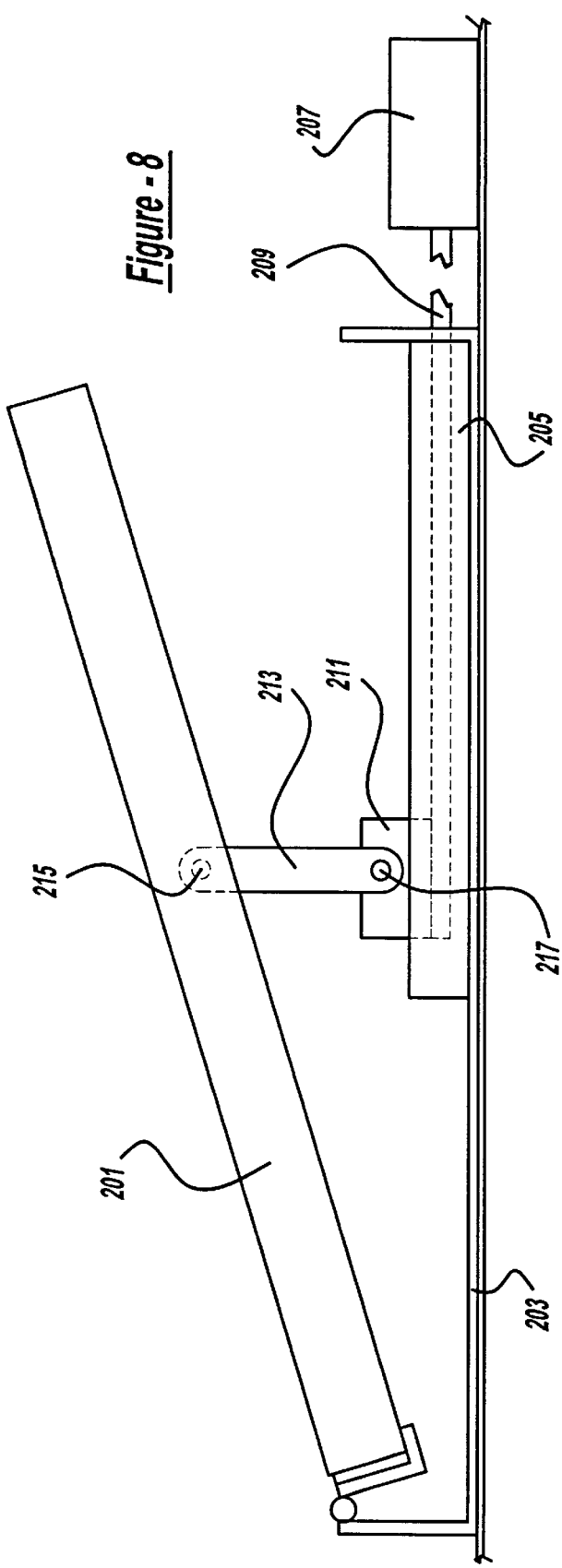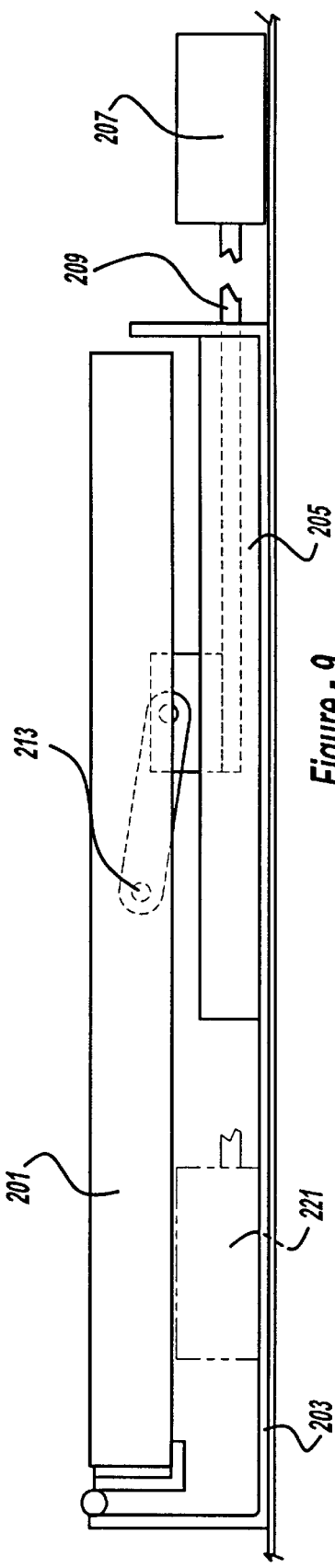

AUTOMOTIVE VEHICLE FOOT REST

BACKGROUND AND SUMMARY OF THE INVENTION

The present invention relates generally to motor vehicles and more specifically to a foot rest for use in an automotive vehicle.

Typically, most automotive vehicles have a somewhat flat floor pan area beneath an occupant's feet, bordered by an inclining toe pan section, a sharply inclining center tunnel section and an inclining rocker panel section. Such conventional floor pans are carpeted but may be uncomfortable to an occupant due to the natural inclination of the occupant's feet when in a sitting position. This situation is often exacerbated for shorter than average height occupants if they are not able to reach the toe pan section.

Various attempts have been made to provide a motorized foot rest to alleviate foot comfort concerns. For example, such devices are disclosed in U.S. Pat. No. 3,059,960 entitled "Motorized Vehicle Foot Rest" which issued to Komorowski et al. on Oct. 23, 1962, and U.S. Pat. No. 5,183,308 entitled "Footrest Apparatus" which issued to Koga et al. on Feb. 2, 1993; both of these patents are incorporated by reference herein. Notwithstanding, these conventional devices appear fairly complicated and heavy by using multiple linkages and jackscrew-type drive mechanisms.

In accordance with the present invention, the preferred embodiment of a motor vehicle foot rest includes a movable foot rest panel, a driving mechanism and an actuator. In another aspect of the present invention, a flexible and linearly movable cable pushes or pulls a linearly movable slide capable of raising or lowering a foot rest panel. A further aspect of the present invention provides a linearly movable slide which is coupled to an elongated and relatively stationary track. A bowden cable and electric motor are used to pivot a foot rest panel in yet another aspect of the present invention.

The motor vehicle foot rest of the present invention is advantageous over conventional constructions in that the present invention minimizes moving and exposed parts, and is relatively lightweight. Accordingly, reliability, part-to-part tolerances and durability are improved. Furthermore, assembly and piece costs are reduced. The foot rest of the present invention also lends itself to aesthetic variations and advantages over traditional devices due to its very compact and modularized nature. Additional advantages and features of the present invention will become apparent from the following description and appended claims, taken in conjunction with the accompanying drawings.

BRIEF DESCRIPTION OF THE DRAWINGS

FIG. 4 is a diagrammatic side view showing the preferred embodiment foot rest, disposed in a raised position;

FIG. 5 is a diagrammatic side view showing the preferred embodiment foot rest, disposed in a lowered position;

FIG. 8 is a diagrammatic side view showing a first alternate embodiment foot rest, disposed in a raised position;

FIG. 9 is a diagrammatic side view showing the first alternate embodiment foot rest, disposed in a lowered position.

DETAILED DESCRIPTION OF THE PREFERRED EMBODIMENT

Figure 1:
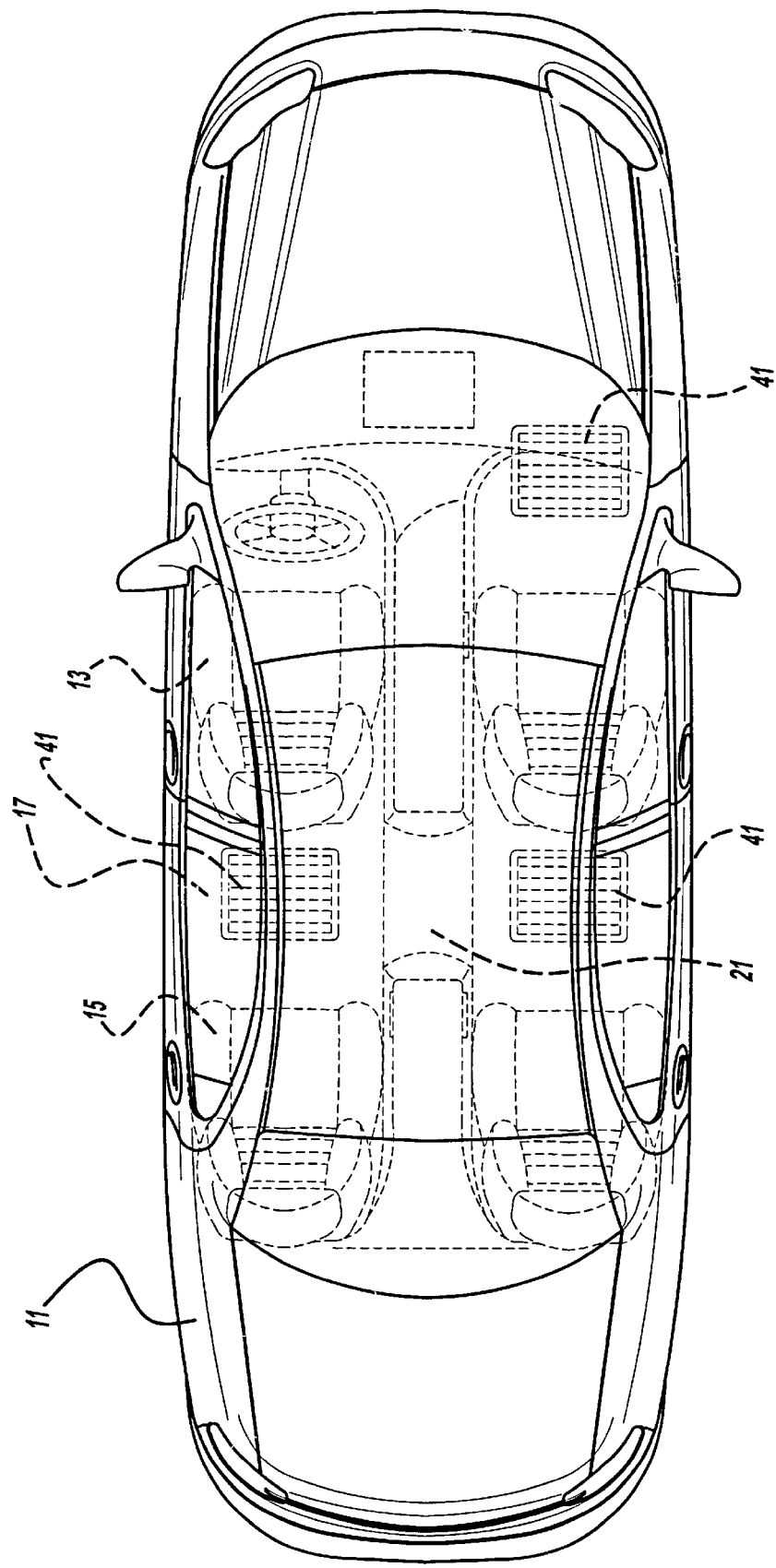
FIG. 1 is a top elevational view of a motor vehicle employing the preferred embodiment of a foot rest of the present invention.
Figure 2:
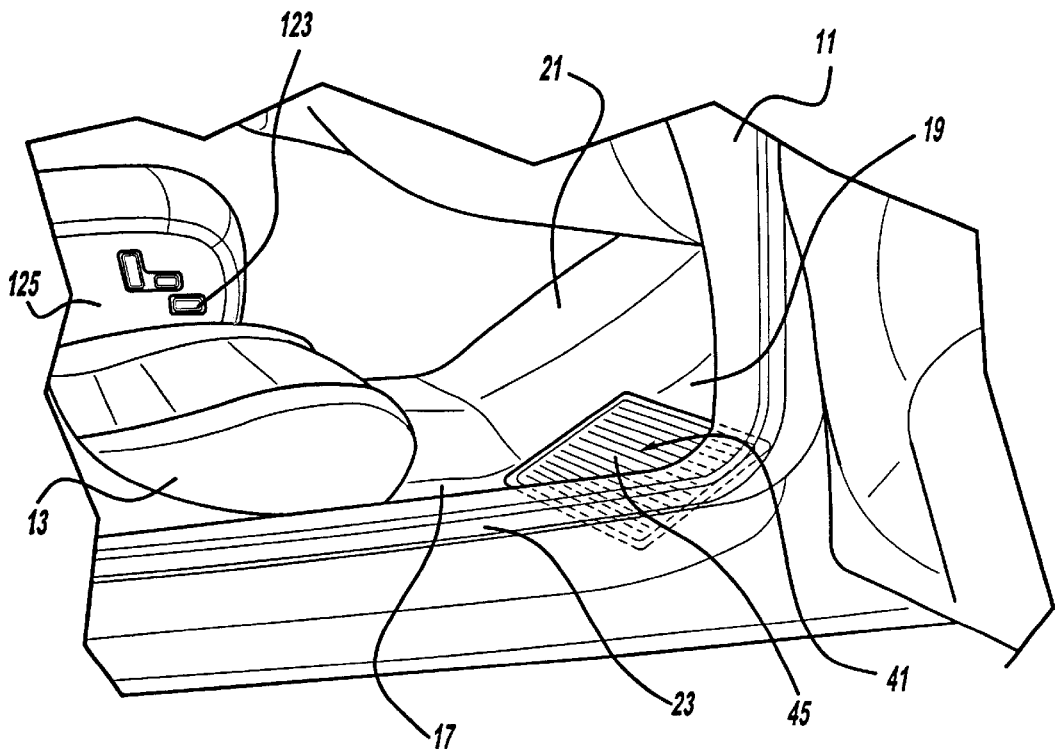
FIG. 2 is a fragmentary perspective view showing the preferred embodiment foot rest.
Figure 3:
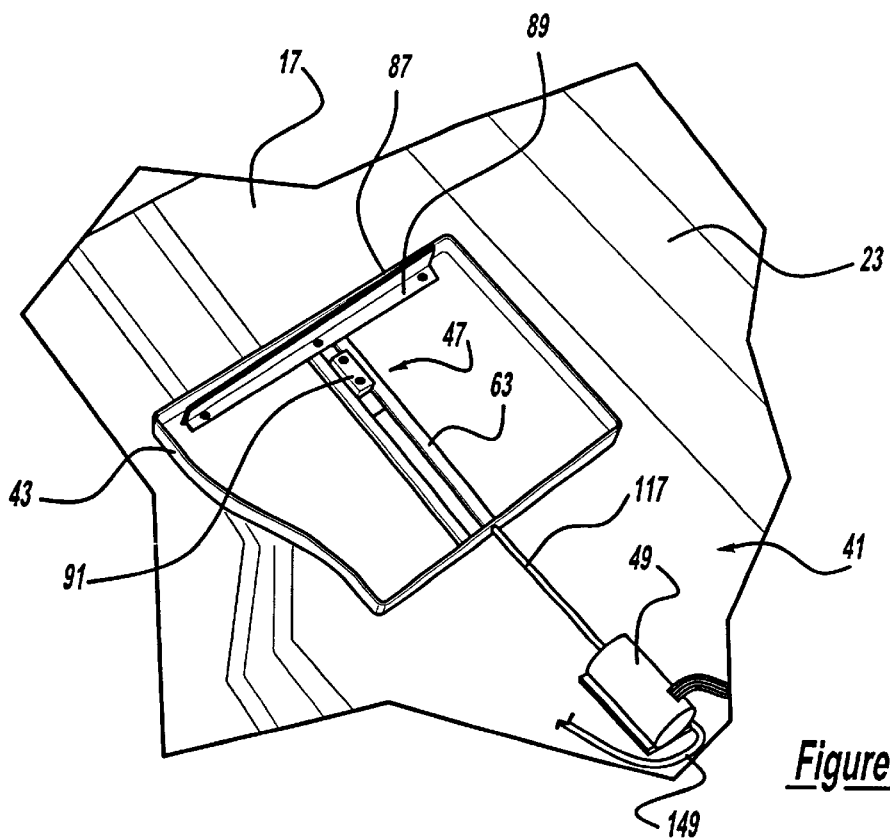
FIG. 3 is a perspective view showing a portion of the preferred embodiment foot rest.
Figure 6:
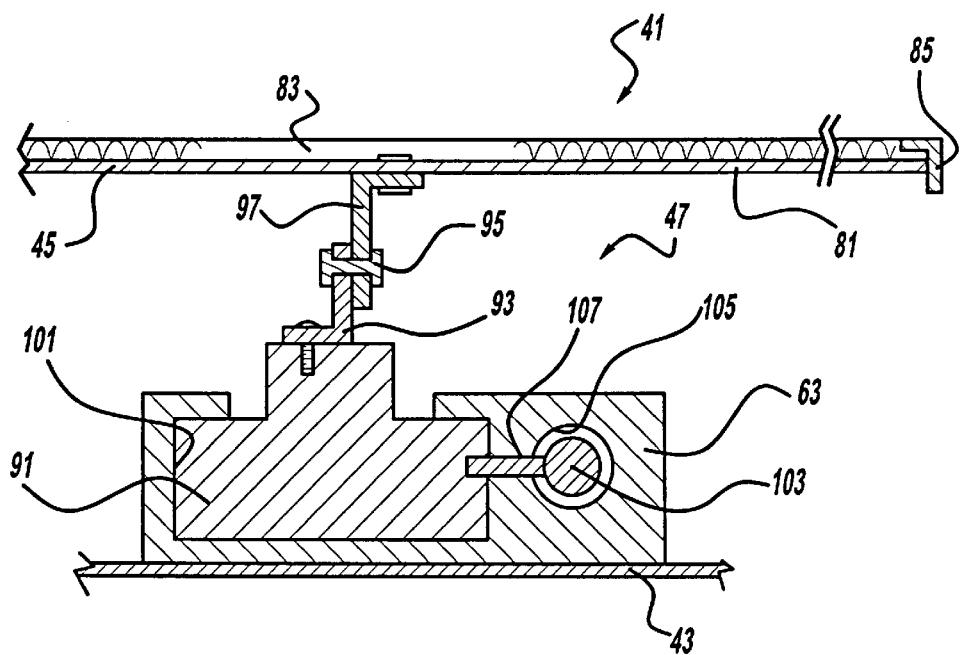
FIG. 6 is a cross sectional view, taken along line 6—6 of FIG. 5, showing the preferred embodiment foot rest.

FIGS. 1 and 2 illustrate a motor vehicle, preferably an automotive vehicle passenger car 11, having a pair of front seats 13 and a pair of back seats 15. A carpet covered floor pan 17 provides a mounting surface for seats 13 and 15 and has an occupant foot area in front of each seat 13 and 15. For the front passenger seat 13, the foot area is generally defined on a front edge by an upwardly inclining toe pan section 19, defined on an inboard side by a tunnel section 21, and defined on an outboard side by an inclining rocker section 23. Similarly, each rear passenger foot area is bordered on its sides by tunnel section 21 and the adjacent rocker section 23, and in front by the rear of front seats 13.

The preferred embodiment of a power foot rest 41 of the present invention is employed in the occupant foot areas coinciding with the front passenger seat 13 and rear passenger seats 15. Referring to FIGS. 3–6, each foot rest 41 is assembled as a modularized unit including a metallic tray 43, a foot panel assembly 45, a driving mechanism 47 and an actuator 49. More specifically, tray 43 includes a generally flat bottom 59 surrounded by upstanding side walls 61. An extruded aluminum track 63 is centrally affixed to bottom 59 of tray 43, and is elongated in a generally fore-and-aft longitudinal direction. Tray 43 is fastened to floor pan 17 by screws, rivets, stud and nut arrangements, or the like.

Foot panel assembly 45 includes a generally flat metal panel 81 covered by a carpet 83 and bordered by a frame 85. A back edge of foot panel assembly 45 is pivotally coupled to tray 43 by a transversely elongated piano-type hinge 87 and a pivoting angle iron 89. The occupant's foot 90 rests on and is supported by foot panel assembly 45.

Drive mechanism 47 includes a slide 91, projection 93, cam follower pin 95 and camming bracket 97. Bracket 97 is elongated in the fore-and-aft direction and is secured to a bottom of foot panel 81 by rivets or the like. A linearly elongated camming slot 99 is disposed within bracket 97. Projection 93 is fastened to an upper surface of slide 91 and is secured to cam follower pin 95. Cam follower pin 95 engages and rides along camming slot 99 in accordance with concurrent movement of slide 91. It should be appreciated that friction reducing rollers or bearings may be journalled about cam follower pin 95 for engagement with bracket 97. A suitable lubricant may also be employed. Projection 93 and bracket 97 are preferably stamped, extruded or machined from aluminum or steel.

Figure 7:
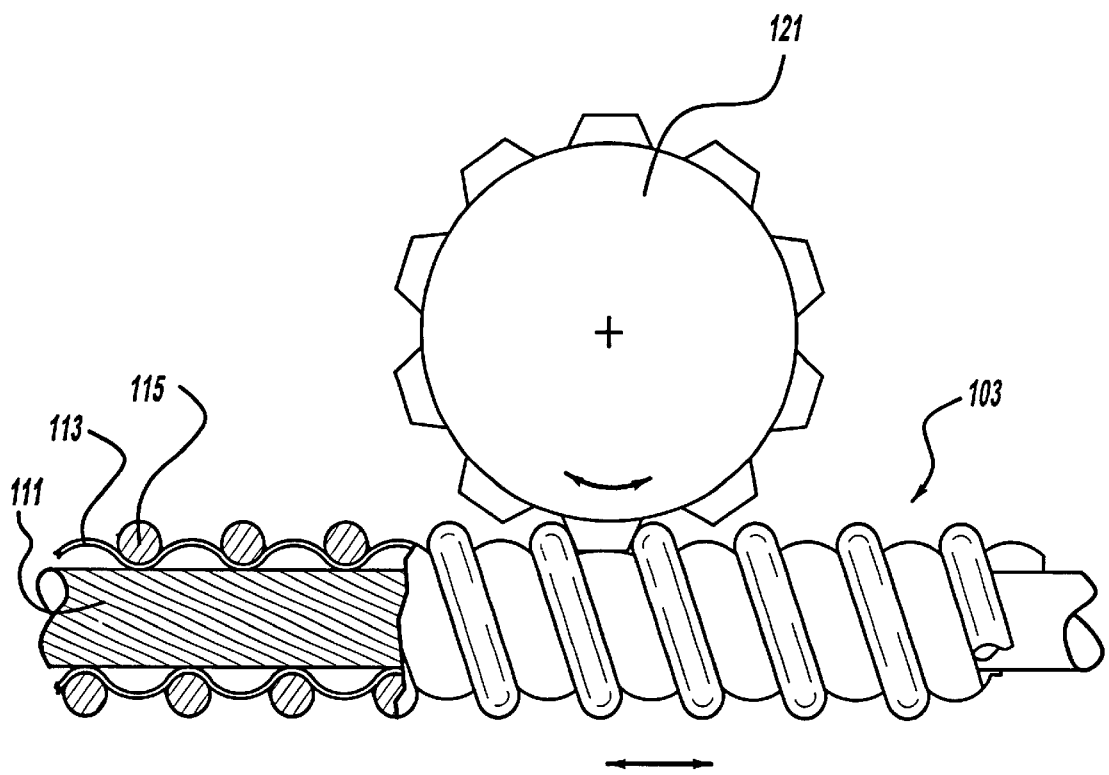
FIG. 7 is a diagrammatic view showing the interface between an actuator and a cable employed in the preferred embodiment foot rest.

Slide 91 is preferably injection molded, extruded or otherwise machined from an engineering grade polymer. Slide 91 has an inverted T-cross sectional shape with transversely extending arms engaging within an undercut channel 101 of track 63. An elongated cable 103 is linearly pushed or pulled within a generally circular bore 105 of track 63, that is elongated in the fore-and-aft direction. An overmolded polymeric end fitting 107 projects transversely through an elongated slot and couples a distal end of cable 103 to slide 91 for simultaneous movement. As can best be observed in FIGS. 3 and 7, cable 103 is a bowden-type cable which is laterally flexible but relatively rigid in a linearly elongated and longitudinal direction. Cable 103 has a tightly coiled inner core 111 fabricated from high strength steel, a flocked or fabric covering 113 generally encapsulating core 111, and an outer high strength steel coil wire 115 helically surrounding covering 113 and providing thread-like characteristics. Such a cable 103 can be obtained from Suhner Manufacturing Inc. of Rome, Georgia and is known as the SU-flex Control Shaft brand cable. A generally rigid and hollow sheath 117 projects from a gear box of actuator 49 and extends to the adjacent end of track 63. Similarly, a take-up sheath 119 extends from the opposite end of the gear box associated with actuator 49. Cable 103 freely travels in the longitudinal direction inside sheaths 117 and 119.

Actuator 49 is preferably a fractional horsepower, direct current electric motor which operably rotates an armature shaft having a helical gear which, in turn, rotates an output worm gear 121. Teeth of worm gear 121 engage wire 115 of cable 103 and drivingly push or pull cable 103 along its elongated longitudinal axis. An occupant accessible switch 123 (see FIG. 2) is mounted to a side of a center console 125 or seat and allows each occupant to independently control the corresponding foot rest 41 in a remotely actuated and automatic manner. Each switch 123 is electrically connected to actuator 49.

In operation, occupant actuation of switch 123 causes energization of actuator 49. This serves to push cable 103 and slide 91 in a linear direction along the relatively stationary track 63. Cam follower pin 95 will accordingly be linearly pushed along camming slot 99 from the lowered first position, shown in FIG. 5, to the pivotally raised position, shown in FIG. 4. The vehicle occupant can also start and stop electric motor energization and the coincidental pivoting movement at any point between the fully raised and fully lowered positions. The fully lowered position is generally horizontal and flush with the adjacent vehicle floor, but may alternately be slightly raised or lowered in relation thereto. It is noteworthy that the preferred embodiment of the present invention foot rest does not employ any moving linkages and relies upon a relatively simply camming and fulcrum type movement driven by a linearly movable cable.

A first alternate embodiment foot rest of the present invention is shown in FIGS. 8 and 9. In this exemplary embodiment, foot rest panel assembly 201 is pivotally coupled to a tray 203 as was disclosed with the preferred embodiment. An elongated track 205 is secured to a center and bottom of tray 203 and an electric motor 207 operably pushes or pulls a bowden cable 209 within track 205. As with the preferred embodiment, a slide 211 linearly moves in a generally fore-and-aft longitudinal direction within track 205. However, in this embodiment, a metal linkage 213 has a first end coupled to a generally middle section of foot rest panel assembly 201 at a generally stationary pivot point 215. An opposite end of link 213 is coupled to slide 211 at a generally stationary pivot point 217. Thus, this system can be constructed so as to place linkage 213 in a somewhat over center condition to maximize geometric leveraging of foot rest panel 201. It is alternately envisioned that an electric motor 221 could be placed inside of tray 203, as is shown in phantom in FIG. 9, instead of the previously disclosed exterior placement of motor 207; this increases the modularized nature of the assembly by compressing packaging and allowing the unit to be self-contained while also minimizing cable lengths and the like.

Figure 10:
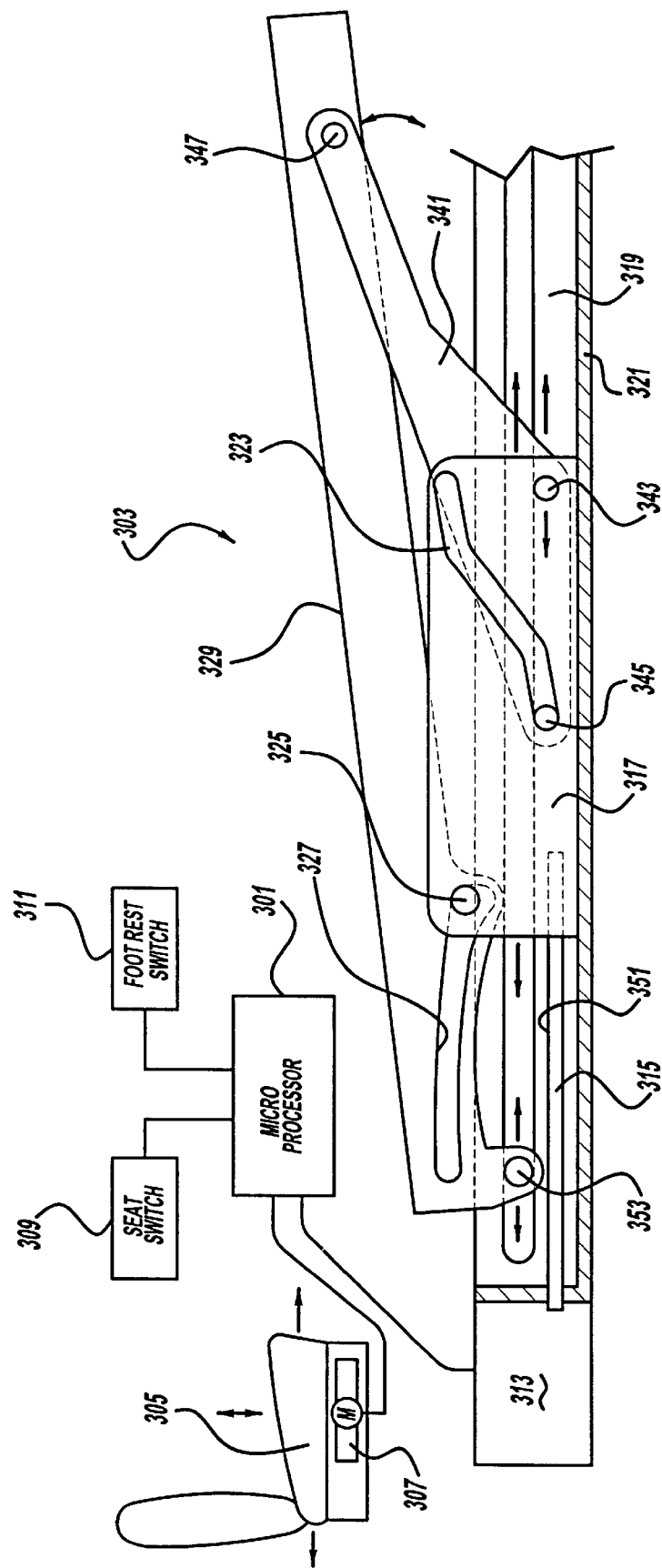
FIG. 10 is a diagrammatic side view showing a second alternate embodiment foot rest, disposed in a raised position.

A second alternate embodiment is illustrated in FIG. 10. In this embodiment, a microprocessor 301 or other electronic control unit can be employed to couple movement of a powered foot rest 303 to movement of a powered occupant front seat 305. Microprocessor 301 can also include a memory-type occupant preference feature. Seat 305 can be vertically moved, horizontally moved and tilted by way of one or more electric motors 307 attached to the seat track mechanism. The rear seat can further employ a "power slouch" movement which moves the bottom cushion forward while lowering and rearwardly tilting the back cushion. The back cushion is connected to tracks affixed to the inner quarter panels or to stationary pancake motors with linkages. The bottom cushion is moved by a rotary cable-driven jackscrew arrangement. An occupant operated seat switch 309 and an occupant operated foot rest switch 311 are also connected to microprocessor 301 to allow for simultaneous or independent seat and foot rest movement. A foot rest electric motor 313 is also electrically connected to and energized by microprocessor 301.

Foot rest electric motor 313 pushes or pulls a bowden type cable 315 as was previously disclosed above. A slide 317, engaged within an undercut channel of a track 319, is linearly moved in response to movement of cable 315. Track 319 is secured to a middle or outboard portion of a floor mounted tray 321. Slide 317 has a slotted S-shape camming surface 323. Camming surface 323 increases in height adjacent a front edge of slide 317. A pin 325 laterally projects in a crosscar manner from a lateral face of slide 317. Slide pin 325 movably rides within a slotted camming surface 327 projecting in a longitudinally fore-and-aft direction and is located in a downturned flange of foot rest panel assembly 329. A somewhat triangular shaped lifting lever 341 has a central fulcrum pin 343 pivotally journalled between a pair of bushing shoes which ride in a groove of track 319. However, fulcrum pin 343 is essentially prevented from vertically moving relative to track 319. Furthermore, a camming extension pin 345 of lever 341 rides along camming surface 323 of slide 317. Thus, fore-and-aft movement of slide 317 causes vertical lifting or lowering of camming pin 345 along camming surface 323. This further causes rotation of lever 341 about fulcrum pin 343 which, in turn, serves to vertically lift and tilt foot rest panel assembly 329 about another pivot pin 347 attached to a forward end of lever 341.

A fore-and-aft elongated camming slot 351 is stationarily mounted in track 319. A main pivot pin 353 laterally projects from the downturned flange of foot rest panel assembly 329 for movably riding in camming slot 351. Such a mechanism, but for use with a spoiler sunroof, can be better understood by referring to co-pending U.S. patent application Ser. No. 09/327,087, which was filed on Jun. 4, 1999, invented by K. Lee et al. and is incorporated by reference herein. Thus, the rear pivot of the foot rest assembly can also move relative to the vehicle floor once the foot rest panel assembly has been initially placed in a fully tilted position, upon energization of foot rest electric motor 313 which pushes cable 315. In operation, when the occupant seat is moved forward by its electric motor, the foot rest electric motor can also be simultaneously energized to move the entire foot rest panel assembly the same distance forward. Also, if the occupant seat is vertically raised, often indicating that an occupant having a short height is present, then the foot rest can be automatically and simultaneously pivoted to a raised position. Alternately, the seat and foot rest can be independently controlled from each other if so desired by the occupant.

While the preferred embodiment of the foot rest has been disclosed, it should be appreciated that various alternatives may fall within the scope of the present invention. For example, a pulley and looped cable arrangement can alternately couple the linearly moving slide to the actuator, although the compact nature of the preferred embodiment will not be maximized. Furthermore, a manual actuator and/or non-flexible member may be substituted in place of the preferred electric motor or somewhat flexible cable. Additionally, the foot panel may be constructed without a fabric covering and may have varying peripheral and surface shapes. It is also envisioned that the slide can directly cam against the bottom of the foot rest panel without use of a camming slot or cam follower. While various materials have been disclosed, other materials may be employed. It is intended by the following claims to cover these and any other departures from the disclosed embodiments which fall within the true spirit of this invention.

The invention claimed is:

1. A foot rest comprising:
    a foot supporting panel movable from a lowered position to a raised position;
    a raising mechanism coupled to the panel;
    a flexible cable coupled to the raising mechanism; and
    an actuator engaging the cable, energization of the actuator operably moving the cable in a linear direction which, in turn, drives the raising mechanism to move the panel between the lowered and raised positions.

2. The foot rest of claim 1 wherein the raising mechanism includes a slide which is linearly movable relative to the panel.

3. The foot rest of claim 2 further comprising a flange downwardly extending from the panel, the flange having an elongated slot, and a cam follower operably riding in the slot and coupling the panel to the slide.

4. The foot rest of claim 3 wherein the cable is pushed in substantially in the elongated slot direction to cause the follower to simultaneously slide in the slot.

5. The foot rest of claim 2 wherein a distal end of the cable is connected to the slide.

6. The foot rest of claim 1 wherein the actuator is an electric motor.

7. The foot rest of claim 6 further comprising a rotatable gear driven by the electric motor, wherein the cable is a bowden-type cable which is directly driven by the gear.

8. The foot rest of claim 1 further comprising a tray having a floor and upstanding side walls, an elongated track mounted to the bottom of the tray, the raising mechanism being slidably attached to the track, and a hinging member coupling the panel to the tray such that the panel is pivotable relative to the tray.

9. The foot rest of claim 1 wherein the entire foot supporting panel is movable in a substantially fore-and-aft direction.

10. A foot rest comprising:
    a foot rest panel movable from a first position to a second position;
    an elongated track having an internal groove;
    a slide linearly movable at least partially inside the groove of the track, the panel being coupled to the slide; and
    an actuator operably driving the slide thereby moving the panel between the first and second positions.

11. The foot rest of claim 10 further comprising an elongated member coupling the actuator to the slide, at least a portion of the elongated member being located internal to the track.

12. The foot rest of claim 11 wherein:
    the actuator linearly pushes the elongated member in the track which, in turn, causes linear sliding of the slide relative to the track; and
    the track is undercut adjacent the groove, and the slide is mounted to the track at least in part by the undercut.

13. The foot rest of claim 12 wherein the elongated member is a flexible cable.

14. The foot rest of claim 10 wherein the entire foot rest panel is movable in a substantially fore-and-aft direction.

15. The foot rest of claim 14 wherein the foot rest panel is pivotable.

16. The foot rest of claim 10 further comprising an occupant accessible switch operable to independently energize the actuator.

17. The foot rest of claim 16 further comprising an electronic control unit connected to the switch and the actuator.

18. The foot rest of claim 10 wherein the foot rest panel is pivotable between the positions.

19. The foot rest of claim 10 wherein the actuator operably causes the panel to move between the first and second positions by use of camming and in a link-free manner.

20. The foot rest of claim 10 further comprising a hinging device pivotably coupled to the panel, the hinging device having a substantially horizontal pivot axis oriented substantially perpendicular to the direction of elongation of the track.

21. A vehicle assembly comprising:
    a foot supporting panel movable from a lowered position to a raised position;
    a raising mechanism coupled to the panel, the mechanism including a linearly movable slide;
    a flexible bowden cable coupled to the slide; and
    a foot rest electromagnetic actuator engaging the cable, energization of the actuator operably moving the cable in a linear direction which, in turn, drives the raising mechanism to move the panel between the lowered and raised positions.

22. The assembly of claim 21 further comprising:
    an occupant seat;
    a seat electromagnetic actuating system operable to move the seat; and
    an electronic control unit connected to and controlling operation of the foot rest electromagnetic actuator and the seat electromagnetic actuating system.

23. The assembly of claim 21 wherein the entire panel is movable in a substantially fore-and-aft direction.

24. The assembly of claim 21 wherein the panel pivots between the positions.

* * * * *